United States Patent Office 3,504,562
Patented Apr. 7, 1970

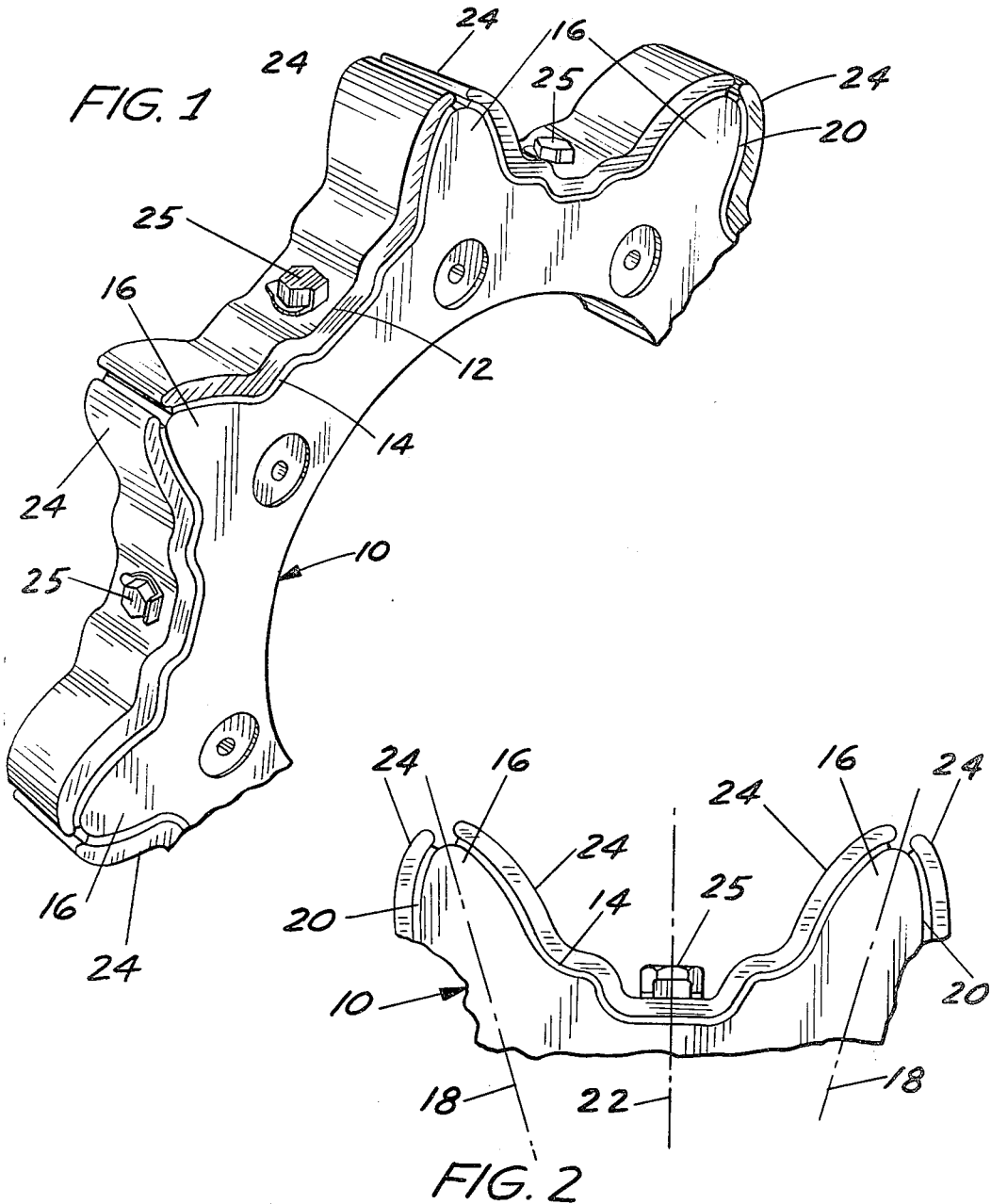

3,504,562
CUSHIONED TOOTH SPROCKET WHEEL
Edward Hirych, Rochester, Mich., assignor, by mesne assignments, to the United States of America as represented by the Secretary of the Army
Filed Oct. 31, 1968, Ser. No. 772,282
Int. Cl. B62d 55/12; F16h 55/12, 55/14, 55/30
U.S. Cl. 74—243                5 Claims

ABSTRACT OF THE DISCLOSURE

A cushioned tooth sprocket including a plurality of wear plates removably mounted on sprocket teeth of a sprocket body. An elastomer is positioned intermediate the wear plates and the sprocket body to cushion externally applied loads.

---

This invention relates to a sprocket wheel for an endless track vehicle and in particular to replaceable wear surfaces mounted on the wheel.

Present drive systems for endless track vehicles have a short life and an inherently high maintenance cost resulting in a high cost per mile of vehicle operation. Early prior part sprocket wheels used in these drive systems were maintained by simply replacing the entire wheel when it became worn. It later became evident that since only the outer surface is subject to wear, a replaceable outer surface should be utilized. Sprocket wheels were then developed which utilize outer surfaces which are replaceable, however, the outer surfaces are of a unitary construction which requires that the track be removed from the sprocket wheel before the outer surface can be replaced. Moreover, the prior art systems are noisy and subject to extreme vibration and shock from the force of the track impacting the sprocket wheel.

According to the present invention, there is provided a cushioned tooth sprocket wheel including a sprocket body having a plurality of sprocket teeth about its periphery. Each tooth has a replaceable wear plate connected thereto by means of suitable connection means and an elastomer juxtaposed between the wear plate and the sprocket body.

Accordingly, it is an object of the present invention to eliminate the aforementioned disadvantages.

It is another object of the present invention to provide for a cushioned tooth sprocket wheel having replaceable wear surfaces.

It is still another object of the present invention to provide a cushioned tooth sprocket wheel having a minimum of noise and vibration.

Other objects and advantages of the present invention will become apparent to those of ordinary skill in the art by the following description when considered in relation to the accompanying drawing of which:

FIGURE 1 is a perspective view of the sprocket wheel according to the invention.

FIGURE 2 is an end elevational view of the sprocket wheel according to the invention.

Referring now to the drawing wherein similar numerals will refer to similar parts in the various figures, the sprocket wheel comprises a sprocket body 10, a plurality of individual wear plates 12, and a plurality of elastomer cushions 14. Sprocket body 10 has a plurality of teeth 16 spaced equidistantly about the outer periphery thereof. Each tooth 16 of sprocket body 10 is symmetrical about individual pitch lines 18 and are formed to present inclined drawing surfaces 20 on either side of its respective pitch line. Adjacent teeth are formed symmetrically with respect to root line 22. An endless track, not shown, is mounted on and driven by the sprocket wheel.

One of the primary causes of severe sprocket tooth wear in sprocket systems is the condition of sliding engagement caused by an overpitched track engaging the sprocket above its radially supported position. The pitch of the sprocket wheel is the distance between respective points on the diameter at which the track is driven. Uniform wear on the face 20 of the sprocket teeth will not affect the sprocket pitch. Wear at the tooth root, however, reduces the diameter of radial support, thus reducing the effective pitch of the sprocket and increasing the difference between the sprocket and track pitches. In an overpitched track, the track will lengthen and engage the sprocket near its radially supported position at the tooth root.

Sprocket wear continues to be a problem notwithstanding the efforts to equalize the pitch of the track and sprocket wheel. The concept of an easily replaceable cushioned wear plate, however, minimizes the problem. A plurality of wear plates 12 are secured to sprocket body 10 by any suitable securing means such as bolt 25. An elastomeric member 14 is positioned between each of wear plates 12 and sprocket body 10. This elastomeric member 14 cushions the impact of the track and hence reduces wear on both the wear plates and the track.

The elastomeric material 14 may be cushions of SBR rubber with positive backing or a cushion of polyurethane. If rubber is utilized, wear plate 12 and rubber cushion 14 are provided as a unit. The rubber is vulcanized to the plate, thus providing a permanent assembly. This unitary construction facilitates a rapid exchange of worn members. Positive backing, provided by the sprocket body is necessary to prevent crushing of the rubber. The tooth geometry and degree of rubber deflection may be controlled. For example, if a 70 Shore Durometer Elastomer Hardness was utilized, a 620 pound force would be required to fully bottom the plate against the sprocket body.

If rubber is used as the elastomer, sprocket body 10 is a precision cast alloy member and is intended to last the life of the vehicle without maintenance. Precision casting is required in order to economically produce the relatively intricate tooth cross section as the cost machining of the tooth faces would be exorbitant. The operating angle of the tooth face is determined by the geometry of the sprocket body, however, an angle of twenty-four degrees has proved satisfactory. Wear plate 12 is secured to sprocket body 10 by bolts 24, placing a slight initial compression on the cushion 14. This compression provides adequate sealing of the dead air space. If necessary, a liquid adhesive can be used to provide further sealing.

If the elastomeric members 14 are comprised of polyurethane, the higher compressive strength of this material makes it possible to allow the full driving forces to be transmitted through it. While complete geometry control of the drive surface during operation is not maintained, the use of a harder elastomer with correspondingly small deflections makes this unnecessary. The inherent simplicity, reduced cost, and operational benefits make this concept the preferred embodiment. The polyurethane elastomer has many outstanding properties including high tensile and tear strength, high abrasion resistance, and excellent impact resistance.

Suitable material for this embodiment is a strip of thermoplastic—thermoset polyurethane with a Shore-D hardness of 60. The material, marketed under the name of "Pellethane," is formed by extrusion and cut to required lengths. To provide further simplification, the cushion has been extended the entire length of the plate.

When polyurethane is utilized as material for the elastomeric member 14, direct control of the drive face 24 is not maintained and sprocket body 10 may now be formed by a simple sand casting which requires only simple machining and no special hardening. The tooth-face angle of twenty-four degrees is satisfactory.

The wear plates 12 are similarly formed regardless of the elastomeric material utilized and can be manufactured by a simple hot forming operation on strip stock or hot rolling a strip to the desired length. Wear plates 12 may be suitably formed from spring steel and austenitic manganese steel, both of which exhibit suitable abrasive characteristics. If rubber is utilized, the wear plate 12 may be vulcanized to the rubber, however, with polyurethane, it remains as a separate unit. As with the rubber elastomer, the plates 12 are drawn into position by bolts 24 which forces the polyurethane against the tooth faces 20. This assists in the retention of the cushion 14 and maintains a tight fit during operation as well as while the cushion assumes a permanent set.

The wear plates 12 are generally concave, symmetrical, and shaped to substantially conform to the outer surface to sprocket body 10. Each wear plate extends along the adjacent inclined wear surfaces 20 of adjacent sprocket teeth 16 and is conveniently secured at its midpoint to sprocket body 10.

In operation, the track (not shown) is fitted about the sprocket wheel so as to engage wear plates 12. If the elastomer 14 is made of rubber, the tooth geometry is defined by the geometry of the outer surface faces 20 of the sprocket body which the plates 12 bottom against. If elastomer cushion 14 is fabricated from polyurethane, direct control of the drive face is not maintained, however, the small amounts of deflection involved makes this control unnecessary. The presence of polyurethane will reduce the surface stress during impact and provides a more uniform load distribution between the plates 12 and sprocket body 10. Adaptation to angular loads which are created by track and final drive deflection is facilitated, thus, further reducing load concentrations.

After repeated use, the wear plates will tend to wear more on one end than the other and hence they may be reversed end for end. The wear on the reverse face will not be as great because it receives some wear during the forward driving and increased sliding of the track due to wear along the root line 22. The ability to reverse the wear plates does substantially increase the life of the wear plates and hence a substantial savings results.

When the wear plates 12 are eventually worn, replacement is a relatively simple task. Prior art drive systems require special facilities to reverse or replace the drive sprockets wherein the track must be broken away and the heavy sprocket and hub assembly must be removed. This operation is not only costly but extremely difficult to perform in the field.

With the present invention, no separation of the track from sprocket wheel nor special equipment is required. The wear plates 12 and elastomer cushions 14 on the portion of the sprocket wheel not engaging the track are replaced by removing bolts 24, discarding the old wear plates and cushions and inserting the new plates and associated elastomer cushions. The sprocket wheel is then rotated so that the new plates support the track and the remainder of the wear plates are free for replacement.

While only a symmetrical concave wear plate has been shown and described, it should be appreciated that the wear plate could extend across the top of each sprocket tooth on either side of the pitch line of a single tooth. A bonded elastomer could exist between the sprocket body and tooth and stops could be provided extending below the edge of the foot of each individual tooth so that after a specified compression, the tooth bottoms out and prevents crushing of the elastomer.

It should further be appreciated that the teeth could be individually rotatable in a rocking motion about a circular seat with the sprocket body. In this configuration, each tooth would have the elastomer bonded to the underside of the tooth and a projecting stop at the edge of the tooth. After the tooth would rotate sufficiently to provide pitch compatibility with loaded track, the stop would bottom out on the sprocket body and prevent crushing of the elastomer.

What has been described therefore is a cushioned tooth sprocket which results in lower maintenance cost resulting from the fact that the wear plates are reversible and replaceable wtihout breaking the track, quieter operation resulting from cushioned engagement impact, and reduced track and sprocket wear resulting from the reduced impact loads and the wear surface's capability to adjust to angular loads.

Since it is obvious that many changes and modifications can be made in the above-described details without departing from the nature and spirit of the invention, it is to be understood that the invention is not limited to said details.

What I claim is:

1. A cushioned tooth sprocket wheel for use in combination with an endless track comprising,
   a sprocket body,
   a plurality of individual wear plates removably connected with said sprocket body,
   elastomeric means juxtaposed between said wear plates and said sprocket body for cushioning loads which are applied to said wear plates, and
   said elastomeric means comprising a plurality of individual elastic members each juxtaposed between one of said wear plates and said sprocket body.

2. A cushioned tooth sprocket wheel as set forth in claim 1 wherein said sprocket body comprises a plurality of sprocket teeth spaced equidistantly about the outer periphery of said sprocket body and forming inclined surfaces for engaging said endless track,
   said individual wear plates and elastic members being mounted on said inclined surfaces.

3. A cushioned tooth sprocket wheel as set forth in claim 2 wherein each of said wear plates comprises a strip of material mounted on and extending between adjacent inclined surfaces of adjacent sprocket teeth.

4. A cushioned tooth sprocket wheel as set forth in claim 3 wherein each of said elastic members comprises a rubber cushion layer vulcanized to each of said wear plates thus providing a permanent assembly.

5. A cushioned tooth sprocket wheel for use in combination with an endless track comprising
   a sprocket body including
      a plurality of sprocket teeth spaced equidistantly about the outer periphery thereof,
      each of said teeth including inclined surfaces located on opposite sides of the pitch line of each of said teeth,
   a plurality of concave wear plates removably connected with said sprocket body,
      each of said plates having opposite ends shaped to conform to the inclined adjacent surfaces of adjacent teeth,
   a plurality of elastomeric layers each juxtaposed between one of said wear plates and said sprocket body and extending between opposite ends of said wear plate, and
   securing means for securing said wear plates, said elastomeric layers, and said sprocket body in compressive engagement.

References Cited

UNITED STATES PATENTS

| 1,870,801 | 8/1932 | Engstrom | 74—243 |
| 2,374,644 | 5/1945 | Bombardier | 74—243 |
| 3,059,491 | 10/1962 | Hoff et al. | 74—243 |
| 3,118,316 | 1/1964 | Fulford | 74—243 |

JAMES A. WONG, Primary Examiner

U.S. Cl. X.R.

74—443, 447, 448, 461; 305—57